United States Patent
Binzer et al.

(10) Patent No.: US 9,638,796 B2
(45) Date of Patent: May 2, 2017

(54) RADAR SENSOR FOR MOTOR VEHICLES

(75) Inventors: Thomas Binzer, Ingersheim (DE);
Christian Waldschmidt, Renningen (DE); Raphael Hellinger, Pforzheim (DE); Dirk Steinbuch, Wimsheim (DE)

(73) Assignee: Robert Bosch GMBH, Stuttgart (DE)

( * ) Notice: Subject to any disclaimer, the term of this patent is extended or adjusted under 35 U.S.C. 154(b) by 337 days.

(21) Appl. No.: 13/977,305

(22) PCT Filed: Nov. 7, 2011

(86) PCT No.: PCT/EP2011/069511
§ 371 (c)(1),
(2), (4) Date: Aug. 16, 2013

(87) PCT Pub. No.: WO2012/089384
PCT Pub. Date: Jul. 5, 2012

(65) Prior Publication Data
US 2013/0321196 A1    Dec. 5, 2013

(30) Foreign Application Priority Data

Dec. 29, 2010    (DE) .......................... 10 2010 064 346

(51) Int. Cl.
*G01S 13/93*    (2006.01)
*G01S 13/87*    (2006.01)
(Continued)

(52) U.S. Cl.
CPC ............ *G01S 13/931* (2013.01); *G01S 13/87* (2013.01); *H01Q 1/3233* (2013.01);
(Continued)

(58) Field of Classification Search
CPC ........... G01S 13/931; G01S 2013/9332; G01S 13/48; H01Q 1/3233
(Continued)

(56) References Cited

U.S. PATENT DOCUMENTS 4,989,011 A * 1/1991 Rosen .................... H01Q 25/04
                                                                    342/373
7,268,722 B2 * 9/2007 Gottwald .............. G01S 13/878
                                                                    342/107
(Continued)

FOREIGN PATENT DOCUMENTS

CN    101841083    9/2010
EP    1 845 585    10/2007
(Continued)

OTHER PUBLICATIONS

International Search Report, PCT International Application No. PCT/EP2011/069511, dated Feb. 29, 2012.

*Primary Examiner* — Marcus Windrich
(74) *Attorney, Agent, or Firm* — Gerard Messina

(57) ABSTRACT

A radar sensor for motor vehicles, having a transmitting antenna in the form of a planar group antenna having multiple antenna elements situated side by side on a shared planar substrate, and having a feed network and a switching device for supplying microwave power to the antenna elements. The antenna elements are situated at equal distances in at least one row; the feed network is designed for supplying the antenna elements with the microwave power having a phase shift which increases at constant increments from one end of the row to the other; and the switching device is designed for controlling the supply of the microwave power to the antenna elements in such a way that, depending on the operating mode, the supply is implemented in a mirror-inverted fashion from opposite ends of the at least one row.

9 Claims, 4 Drawing Sheets

(51) Int. Cl.
*H01Q 1/32* (2006.01)
*H01Q 21/08* (2006.01)
*H01Q 25/00* (2006.01)

(52) U.S. Cl.
CPC ........... *H01Q 1/3283* (2013.01); *H01Q 21/08* (2013.01); *H01Q 25/002* (2013.01); *G01S 2013/9314* (2013.01); *G01S 2013/9317* (2013.01); *G01S 2013/9332* (2013.01); *G01S 2013/9378* (2013.01)

(58) Field of Classification Search
USPC .......................................................... 342/70
See application file for complete search history.

(56) References Cited

U.S. PATENT DOCUMENTS

| | | | | |
|---|---|---|---|---|
| 7,315,279 | B1* | 1/2008 | Milbourne | H01Q 25/002 342/354 |
| 7,333,045 | B1* | 2/2008 | Aomori | G01S 13/88 342/175 |
| 7,405,695 | B2* | 7/2008 | Liu | H01Q 3/24 342/374 |
| 7,656,347 | B2* | 2/2010 | Hong | G01S 7/032 342/175 |
| 7,663,533 | B2* | 2/2010 | Toennesen | G01S 13/48 342/154 |
| 8,427,362 | B2* | 4/2013 | Ookawa | H01Q 1/3233 342/70 |
| 2006/0187114 | A1* | 8/2006 | Gibson | G01S 7/285 342/195 |
| 2007/0222662 | A1* | 9/2007 | Toennesen | G01S 13/48 342/27 |
| 2008/0150800 | A1* | 6/2008 | Tsuji | H01P 1/185 342/368 |
| 2008/0211644 | A1* | 9/2008 | Buckley | B62D 15/027 340/435 |
| 2009/0045928 | A1* | 2/2009 | Rao | B60Q 9/006 340/435 |
| 2009/0231182 | A1* | 9/2009 | Nishimura | G01S 3/48 342/70 |
| 2010/0321268 | A1* | 12/2010 | Hasch | H01Q 1/3233 343/818 |
| 2011/0074620 | A1* | 3/2011 | Wintermantel | G01S 7/032 342/70 |

FOREIGN PATENT DOCUMENTS

| | | |
|---|---|---|
| EP | 2 026 099 | 2/2009 |
| JP | 2006211490 | 8/2006 |
| JP | 2007531872 | 11/2007 |
| WO | WO 2005/073753 | 8/2005 |

\* cited by examiner

RADAR SENSOR FOR MOTOR VEHICLES

FIELD

The present invention relates to a radar sensor for motor vehicles, having a transmitting antenna in the form of a planar group antenna having multiple antenna elements situated side by side on a shared planar substrate, and having a feed network and a switching device for supplying microwave power to the antenna elements.

BACKGROUND INFORMATION

Antennas of radar sensors which are provided for use in motor vehicles are frequently designed as patch antennas on an HF substrate. This allows a cost-effective structure of the radar sensor. The use of group antennas makes it possible to achieve the desired directional characteristic of the radar sensor in azimuth and/or in elevation without needing a radar lens. Frequently, separate antennas are used for the emission of the radar signal and for the reception of the reflected signal. The desired directional characteristic of the transmitting antenna in azimuth may be achieved in that the microwave power is fed in phase to the multiple antenna elements situated side by side on the substrate. Interference then produces a radar lobe, the main radiation direction of which is oriented at a right angle to the plane of the substrate and covers an azimuth angle range of approximately −45° to approximately +45°. On the receive side, multiple antenna elements or patches also situated side by side are used, which, however, are associated with different receive channels, making it possible to infer the azimuth angle of the object based on the phase differences between the signals received by the different antenna elements.

In particular, the present invention relates to a rear area radar sensor system for motor vehicles, for example, in an LCA system (Lane Change Aid), which supports the driver when changing lanes by warning of vehicles approaching on the same lane or the passing lane from behind. In this case, the radar sensor system in the rearward direction must have a large range, so that even fast vehicles may be detected in time, and on the other hand, it should be able to locate vehicles which are situated at a short distance or nearly abreast on the passing lane and are thus situated in the driver's blind spot.

SUMMARY

An object of the present invention is to provide a simply constructed and cost-effective radar sensor system, which makes it possible to fulfill a wider range of functions.

In accordance with the present invention, a radar sensor is used in which the antenna elements are situated at equal distances in at least one row, the feed network is designed for supplying the antenna elements with the microwave power having a phase shift which increases at constant increments from one end of the row to the other, and the switching device is designed for controlling the supply of the microwave power to the antenna elements in such a way that, depending on the operating mode, the supply is implemented in a mirror-inverted fashion from opposite ends of the at least one row.

Interference between the radar waves emitted by the different antenna elements results in the formation of an asymmetric antenna diagram, so that a large part of the microwave power is emitted at high intensity in a certain direction obliquely to the substrate while a smaller part of the microwave power is emitted to the opposite side under a high azimuth angle. If the radar sensor is now installed into the vehicle in such a way that the substrate forms an angle of approximately 45° with the longitudinal axis of the vehicle, this makes it possible to detect the following traffic in the same lane and in the passing lane in one operating mode, even including the blind spot, and fulfilling the functions LCA and BSD (Blind Spot Detection). In the other operating mode, a mirror-inverted antenna diagram is generated, which may be used for a CTA function (Cross Traffic Alert), which warns the driver, for example, of cross traffic when backing out of a parking space or entering one.

Another advantage of the present invention is that identical sensors may be installed on opposite sides of the vehicle, in which only the functions of the two operating modes are interchanged.

Preferably, the antenna elements, which are connected to the feed network, form a pure transmitting antenna, while a separate receiving antenna is provided for the reception of the radar echo, which may, for example, be formed by a planar group antenna, which is situated on the same substrate as the transmitting antenna.

In a preferred specific embodiment, two separate, parallel rows of antenna elements are provided on the transmitter side, each being fed serially with microwave power from opposite sides by a separate feed network. The switching device may then be formed by an oscillator having two switchable outputs, which are permanently connected to one each of the two feed networks. The two rows may be situated on one line or also vertically offset and overlapping one another so that they may be accommodated on a compact substrate. The power supplied to the antenna elements may vary depending on the operating mode. For example, it is advantageous to apply a lower amplitude to the antenna elements for the CTA function, so that the main lobe directed to the side for the CTA function has a smaller range and is thus less sensitive to interference than the main lobe directed rearwards for the LCA function.

The distance between two adjacent antenna elements of each row may, for example, be one-half wavelength, and the phase shift may vary from antenna element to antenna element by 120°. In this way, a main lobe is achieved, which forms an angle of approximately 35° with the perpendicular of the substrate. The main lobe is then oriented to the longitudinal axis or the transverse axis of the vehicle in both operating modes in such a way that the sensor is relatively insensitive to the rear in the CTA operating mode, so that the function is not disturbed by clutter of vehicles parked directly behind the vehicle. Accordingly, the sensor in the LCA operating mode is relatively insensitive to overtaking vehicles or overtaken vehicles that are abreast with the host vehicle at a greater distance.

Preferably, the feed network is designed in such a way that the amplitude of the emitted microwaves varies from antenna element to antenna element, for example, decreasing from one end of the row of the antenna elements to the opposite end. This evens out the power distribution of the emitted radar radiation across the azimuth angle, so that position finding gaps between the main lobe and the side lobes are largely closed.

An exemplary embodiment of the present invention is explained below with reference to the figures.

DETAILED DESCRIPTION OF EXAMPLE EMBODIMENTS

Figure 1:
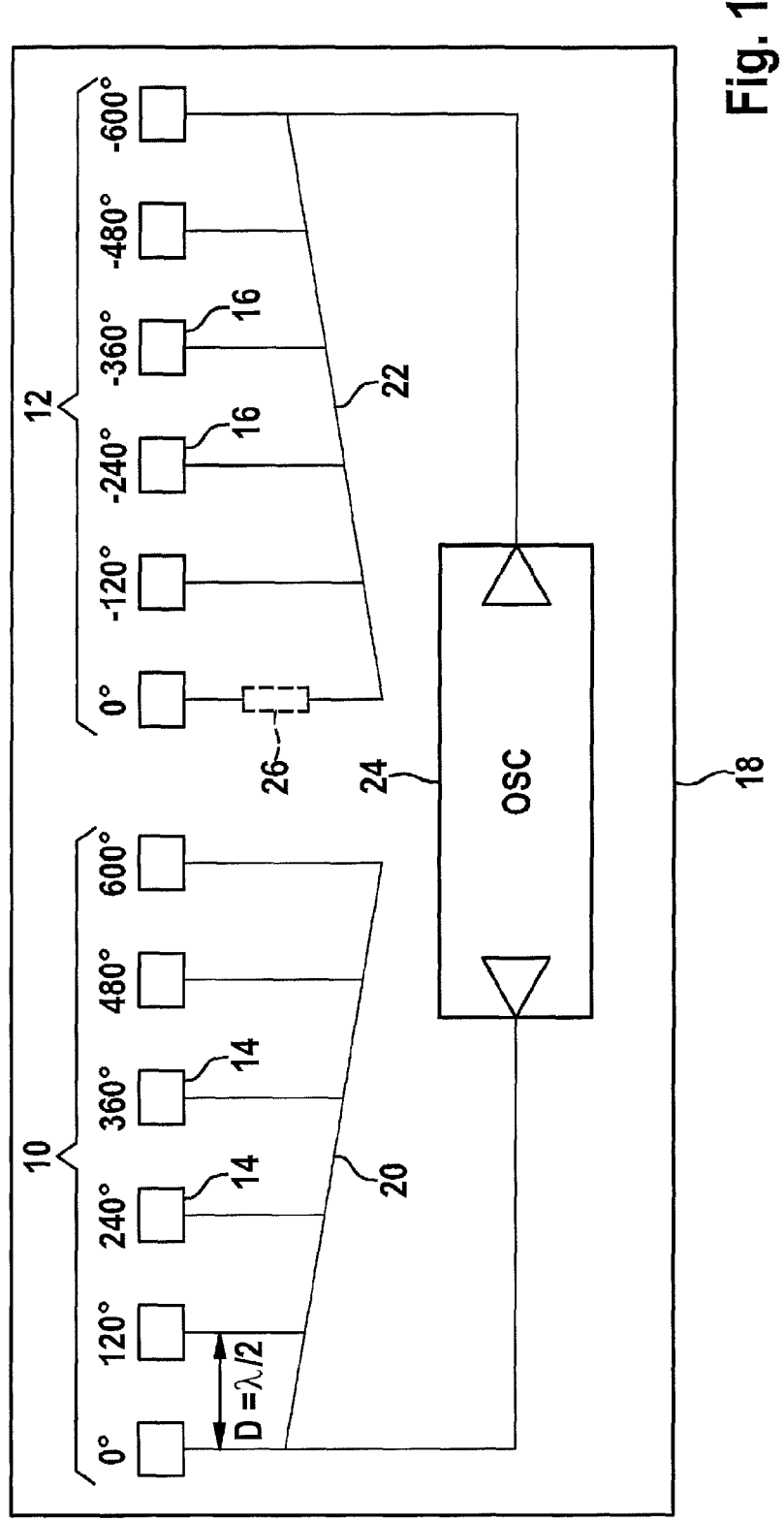
FIG. 1 shows a schematic representation of multiple antennas situated in two horizontal rows on a substrate, including an example for the phase assignment of the individual antenna elements.

In FIG. 1 two horizontal rows 10, 12 are shown, each having six antenna elements 14, 16, which are situated on an HF substrate 18 at uniform distances within each row. Antenna elements 14, 16 are represented in this case as individual patches. Via particular feed networks 20, 22, the antenna elements receive a microwave signal, which is then to be emitted as radar radiation. Both feed networks 20, 22 are connected to different outputs of a switchable oscillator 24, which generates the microwave signal to be transmitted. The two outputs of oscillator 24 may be switched on and off independently of one another, and the amplitude of the microwave signal may be set independently for each output.

Feed networks 20, 22 are designed in such a way that antenna elements 14, 16 of each row are fed serially, although the feed devices for both rows 10 and 12 are mirror-inverted.

Center distance D of antenna elements 14, 16 of each row amounts to one-half the wavelength of the microwave radiation ($D=\lambda/2$). The length of the sections of feed networks 20, 22, which connect two adjacent antenna elements to one another, determines the phase difference between these antenna elements. An example for the phase assignment of antenna elements 14, 16 is provided in FIG. 1. In row 10, antenna elements 14 have phase shifts of 120°, 240°, 360°, 480° and 600° in relation to the first antenna element on the left end of the row (phase=0°). The phase shift thus increases in equal increments (120°). In row 12, antenna elements 16 have phase shifts of −120°, −240°, −360°, −480° and −600° in relation to the last antenna element on the left end of the row (phase=0°).

Figure 2:
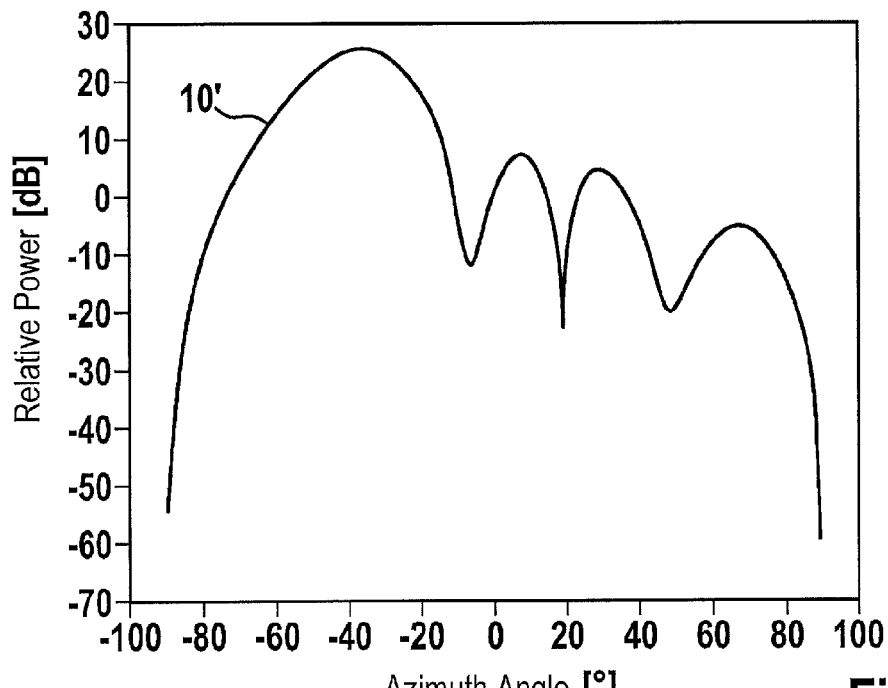
FIGS. 2 and 3 show antenna diagrams for the antenna configuration and the phase assignment according to FIG. 1.
Figure 3:
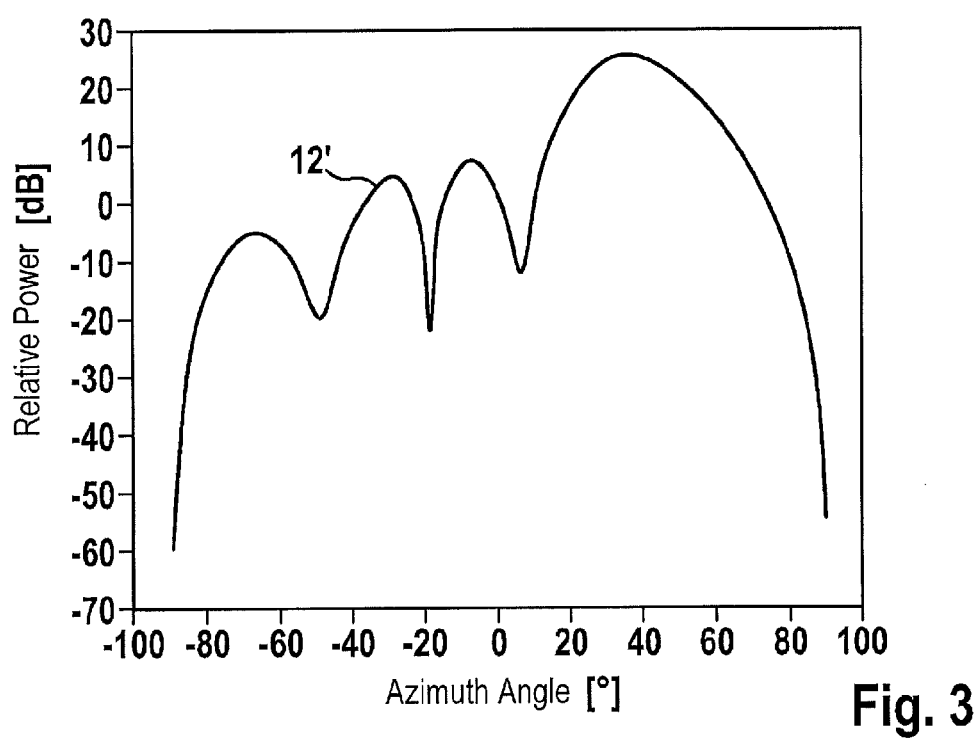

FIGS. 2 and 3 show antenna diagrams that result from the phase assignment shown in FIG. 1 for row 10 or 12. Curve 10' in FIG. 2 indicates the relative power of the radar radiation emitted by antenna elements 14 of row 10 as a function of the azimuth angle. Interference between the radiation components emitted by the individual antenna elements results in a pronounced maximum at an azimuth angle of approximately −35°. The power drops for larger (based on absolute value) azimuth angles. In the range from −20° to +70°, there are, on the other hand, several secondary maxima, so that the power stays at a moderately high level in the range of approximately +80°. Curve 12' in FIG. 3 is mirror-inverted in relation to curve 10' and indicates the relative power of the radar radiation emitted by antenna elements 16 of row 12 as a function of the azimuth angle.

With the aid of so-called transformers 26 (suggested only by a dashed line in FIG. 1) in feed networks 20, 22, it is possible to set an amplitude assignment for each antenna element 14, 16 individually. This makes it possible for the minimums to be rather weakly pronounced in the antenna diagrams.

Each of rows 10, 12 of antenna elements 14, 16 forms a transmitting antenna. Additional antenna elements on substrate 18, which are not shown, form a (preferably angle-resolving) receiving antenna for receiving the radar echoes.

The antenna elements of the transmitting antennas and the receiving antenna as well as feed networks 20, 22 may be formed using microstrip technology on substrate 18, which also accommodates oscillator 24 as well as, if necessary, additional components of the radar sensor, such as, for example, mixers and the like.

Instead of individual antenna elements 14, 16, vertically oriented antenna columns may optionally be provided, each including multiple serially fed antenna patches.

Figure 4:
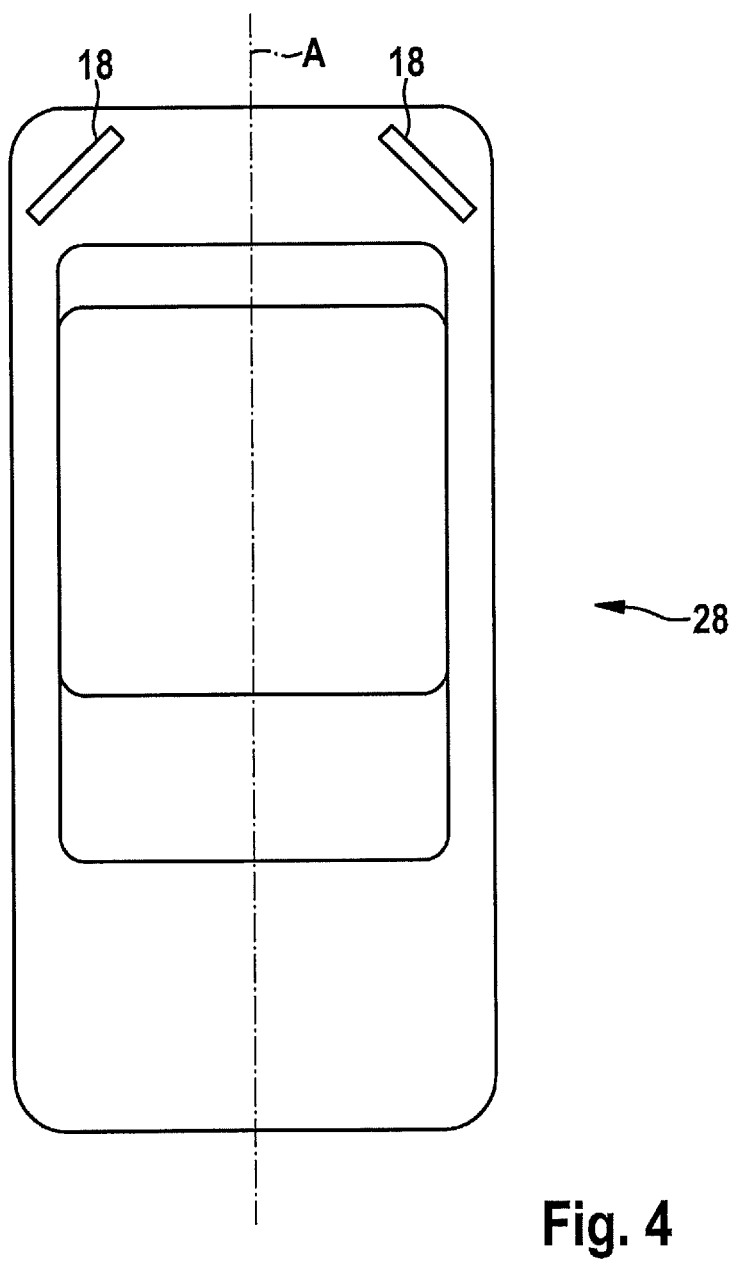
FIG. 4 shows a schematic outline of a motor vehicle for illustrating the installation of radar sensors according to the present invention.

FIG. 4 illustrates the installation of radar sensors having the above-described antenna system in a motor vehicle 28. Only the outlines of plate-shaped, vertically oriented substrates 18 of the radar sensors are shown schematically in this case. It is apparent that in each rear corner of vehicle 28, a radar sensor is situated in such a way that its substrate 18 forms an angle of 45° with longitudinal axis A of the vehicle.

Figure 5:
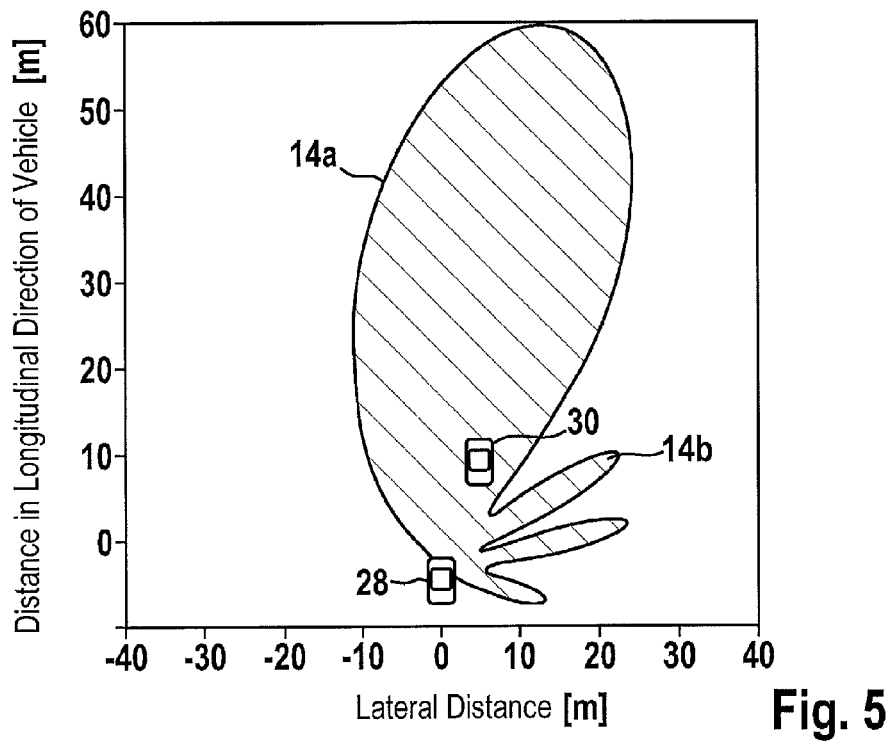
FIGS. 5 and 6 show position finding diagrams of a radar sensor according to the present invention in different application scenarios.

FIG. 5 shows a position finding diagram of the radar sensor, which is located on the left side of vehicle 28 in the direction of travel. The shaded area in FIG. 5 indicates the area in which the radar radiation has a sufficient amplitude for the position finding of objects, when the microwave signal of oscillator 24 is fed to row 10 of antenna elements 14 in an LCA operating mode. This results in a very pronounced, primarily rearward oriented main lobe 14a, which forms an angle of approximately 15° with the longitudinal axis of the vehicle, and is thus suited in particular for finding the position of overtaking vehicles 30 on the left adjacent lane, as well as vehicles approaching on the lane of host vehicle 28 at a high speed. Smaller side lobes 14b are more directed to the side of the vehicle and allow in particular the position finding of vehicles that are located in the driver's blind spot. The range is, however, limited in such a way that interfering position finding signals of vehicles on the lane adjacent to the next lane or on the oncoming lane will be largely suppressed.

Figure 6:
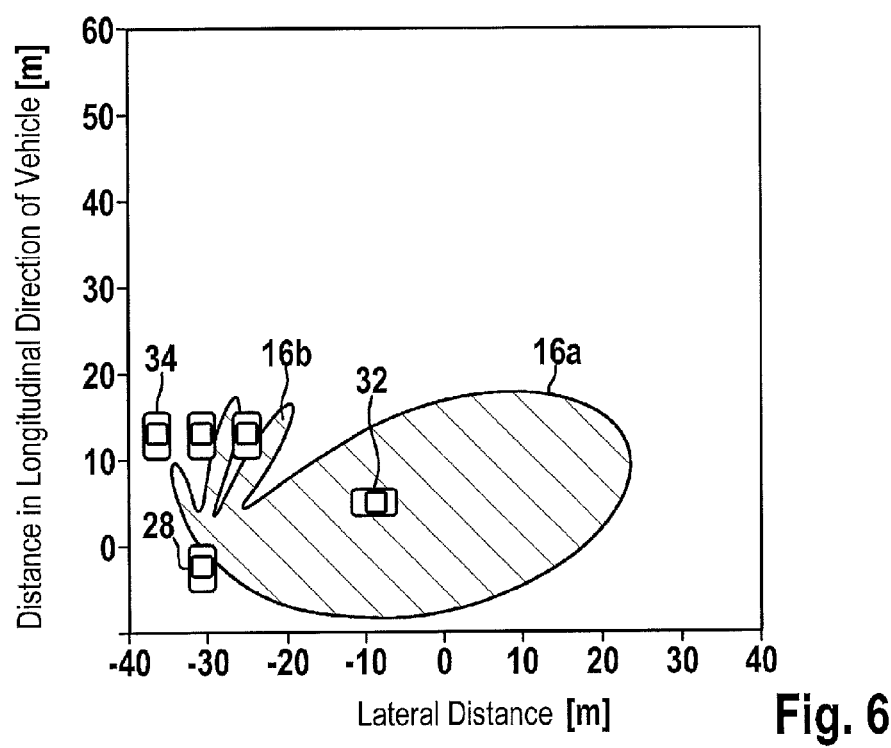

FIG. 6 shows a position finding diagram for the operation of the same radar sensor of vehicle 28 as part of a CTA function, which may be used, for example, for warning the driver of cross traffic in the parking lane, for example, when backing out of a parking space. The cross traffic is represented in FIG. 6 by a vehicle 32. In this case, row 10 of the antenna elements is switched off, and the power of oscillator 24 is fed into row 12 of antenna elements 16, preferably at somewhat lower power than in the LCA mode according to FIG. 5. As FIG. 6 shows, a main lobe 16A results in this case having a somewhat lower range, which is primarily directed to the side of vehicle 28 and forms an angle of approximately 75° with the longitudinal axis of vehicle 28. Side lobes 16b having a short range are in this case directed generally to the rear. Limiting the range of these side lobes avoids undesirable clutter of vehicles 34 parking behind host vehicle 28 in this mode.

What is claimed is:

1. A radar sensor for a motor vehicle, comprising:
    a transmitting antenna in the form of a planar group antenna having multiple antenna elements situated side by side on a shared planar substrate, the antenna elements being situated at equal distances in at least one row;
    a feed network for supplying the antenna elements with a microwave power signal, wherein the antenna elements are phase shifted so that the phases of the antenna elements increase by a constant increment between adjacent antenna elements from one end of the row to the other, wherein the same constant increment characterizes the phase shifts between every pair of consecutively adjacent antenna elements; and a switching device to supply the microwave power signal to the antenna elements, and to control the supply of the microwave power signal to the antenna elements by switching between:
  a first operating mode in which a radiation power varies among the antenna elements, and
  a second operating mode in which the radiation power is swapped between corresponding antenna elements on opposite ends of the row, so that the radiation power is a mirror image of the radiation power in the first operating mode when plotted on an antenna diagram, wherein the radar sensor includes two rows of antenna elements, a separate feed network via which the microwave power signal is fed serially into the antenna elements being assigned to each one of the two rows, the feed devices for the two rows being diametrically opposed to one another, and wherein the switching device is formed by an oscillator having two outputs which can be switched on and off independently from one another, and wherein each of the feed networks is permanently connected to a respective one of the two outputs.

2. The radar sensor as recited in claim 1, wherein a distance between adjacent antenna elements within each row amounts to one-half the wavelength of the emitted microwave radiation.

3. The radar sensor as recited in claim 1, wherein the constant increment of the phase shift amounts to 120°.

4. A motor vehicle having a radar sensor, the radar sensor including a transmitting antenna in the form of a planar group antenna having multiple antenna elements situated side by side on a shared planar substrate, the antenna elements being situated at equal distances in at least one row, a feed network for supplying the antenna elements with a microwave power signal, wherein the antenna elements are phase shifted so that the phases of the antenna elements increase by a constant increment between adjacent antenna elements from one end of the row to the other, wherein the same constant increment characterizes the phase shifts between every pair of consecutively adjacent antenna elements, and a switching device to supply the microwave power signal to the antenna elements, and to control the supply of the microwave power signal to the antenna elements by switching between a first operating mode and a second operating mode, a substrate of the radar sensor forming a 45° angle with a longitudinal axis of the vehicle, wherein in the first operating mode, a radiation power varies among the antenna elements, and in the second operating mode, the radiation power is swapped between corresponding antenna elements on opposite ends of the row, so that the radiation power is a mirror image of the radiation power in the first operating mode when plotted on an antenna diagram, wherein the radar sensor includes two rows of antenna elements, a separate feed network via which the microwave power signal is fed serially into the antenna elements being assigned to each one of the two rows, the feed devices for the two rows being diametrically opposed to one another, and wherein the switching device is formed by an oscillator having two outputs which can be switched on and off independently from one another, and wherein each of the feed networks is permanently connected to a respective one of the two outputs.

5. The motor vehicle as recited in claim 4, wherein two radar sensors of identical design are situated in a mirror-inverted fashion on opposite sides of the vehicle.

6. A driver assistance system for a motor vehicle, comprising:
  a lane change assist system for position finding of vehicles on the same lane as the motor vehicle or an adjacent lane in the rear area of the motor vehicle;
  a cross-traffic alert function for the position finding of vehicles which move transversely to a longitudinal axis of the motor vehicle; and
  a radar sensor including a transmitting antenna in the form of a planar group antenna having multiple antenna elements situated side by side on a shared planar substrate, the antenna elements being situated at equal distances in at least one row, a feed network for supplying the antenna elements with a microwave power signal, wherein the antenna elements are phase shifted so that the phases of the antenna elements increase by a constant increment between adjacent antenna elements from one end of the row to the other, wherein the same constant increment characterizes the phase shifts between every pair of consecutively adjacent antenna elements, and a switching device to supply the microwave power signal to the antenna elements, and to control the supply of the microwave power signal to the antenna elements by switching between:
    a first operating mode in which a radiation power varies among the antenna elements, and
    a second operating mode in which the radiation power is swapped between corresponding antenna elements on opposite ends of the row, so that the radiation power is a mirror image of the radiation power in the first operating mode when plotted on an antenna diagram, wherein the operating modes are selectable with the aid of the switching device as a function of a desired assistance function, wherein the radar sensor includes two rows of antenna elements, a separate feed network via which the microwave power signal is fed serially into the antenna elements being assigned to each one of the two rows, the feed devices for the two rows being diametrically opposed to one another, and wherein the switching device is formed by an oscillator having two outputs which can be switched on and off independently from one another, and wherein each of the feed networks is permanently connected to a respective one of the two outputs.

7. The radar sensor as recited in claim 1, wherein the first operating mode produces, based on first received radar echoes, a warning indicating a vehicle approaching from behind on the same lane or on an adjacent lane, and wherein the second operating mode produces, based on second received radar echoes, a warning concerning cross traffic.

8. The motor vehicle as recited in claim 4, wherein the first operating mode produces, based on first received radar echoes, a warning indicating a vehicle approaching from behind on the same lane or on an adjacent lane, and wherein the second operating mode produces, based on second received radar echoes, a warning concerning cross traffic.

9. The driver assistance system as recited in claim 6, wherein in the first operating mode, the lane change assist system produces, based on first received radar echoes, a warning indicating a vehicle approaching from behind on the same lane or on the adjacent lane, and wherein in the second operating mode, the cross-traffic alert function produces, based on second received radar echoes, a warning concerning cross traffic.

* * * * *